(12) United States Patent
Zhang et al.

(10) Patent No.: US 9,288,026 B2
(45) Date of Patent: Mar. 15, 2016

(54) TRANSMISSION OF REFERENCE SIGNAL ON NON-CONTIGUOUS CLUSTERS OF RESOURCES

(75) Inventors: Xiaoxia Zhang, San Diego, CA (US); Wanshi Chen, San Diego, CA (US); Xiliang Luo, Northridge, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 12/816,929

(22) Filed: Jun. 16, 2010

(65) Prior Publication Data

US 2011/0141982 A1 Jun. 16, 2011

Related U.S. Application Data

(60) Provisional application No. 61/219,294, filed on Jun. 22, 2009.

(51) Int. Cl.
*H04L 5/00* (2006.01)
*H04J 13/00* (2011.01)
*H04L 27/26* (2006.01)

(52) U.S. Cl.
CPC ........... *H04L 5/0051* (2013.01); *H04J 13/0062* (2013.01); *H04L 5/0041* (2013.01); *H04L 27/2613* (2013.01); *H04L 5/0016* (2013.01); *H04L 5/0023* (2013.01)

(58) Field of Classification Search
None
See application file for complete search history.

(56) References Cited

U.S. PATENT DOCUMENTS

| | | | |
|---|---|---|---|
| 5,682,376 A | 10/1997 | Hayashino et al. | |
| 6,754,475 B1 * | 6/2004 | Harrison et al. | 455/115.1 |
| 7,583,939 B2 * | 9/2009 | Mehta et al. | 455/91 |
| 7,701,919 B2 * | 4/2010 | Ah Lee | 370/344 |
| 7,912,115 B2 * | 3/2011 | Zhao et al. | 375/219 |

(Continued)

FOREIGN PATENT DOCUMENTS

| | | |
|---|---|---|
| CN | 101208874 A | 6/2008 |
| EP | 1942596 | 7/2008 |

(Continued)

OTHER PUBLICATIONS

Noh et al., U.S. Appl. No. 61/100,271, filed Sep. 26, 2008, "DMRS Transmission for Uplink MIMO", p. 1-16.*

(Continued)

*Primary Examiner* — Gregory Sefcheck
(74) *Attorney, Agent, or Firm* — Liem T. Do

(57) ABSTRACT

A reference signal is transmitted on multiple non-contiguous clusters of resources. A user equipment (UE) may be scheduled for data transmission on the multiple non-contiguous clusters, and each cluster may cover a set of contiguous subcarriers. The UE may generate the reference signal based on at least one reference signal (RS) sequence using code division multiplexing (CDM) or frequency division multiplexing (FDM). In a design, the UE generates the reference signal with CDM based on a single RS sequence having a length matching the total length of the multiple non-contiguous clusters. In another design, the UE generates the reference signal with CDM based on one RS sequence for each cluster. In yet another design, the UE generates the reference signal with FDM and transmits the reference signal on a subset of all subcarriers for the multiple non-contiguous clusters.

11 Claims, 10 Drawing Sheets

(56) References Cited

U.S. PATENT DOCUMENTS

| | | | |
|---|---|---|---|
| 7,969,943 B2* | 6/2011 | Miki et al. | 370/329 |
| 7,974,177 B2* | 7/2011 | Ofuji et al. | 370/203 |
| 8,036,197 B2* | 10/2011 | Pajukoski et al. | 370/342 |
| 8,102,896 B2* | 1/2012 | Pajukoski et al. | 375/146 |
| 8,130,711 B2* | 3/2012 | Noh et al. | 370/329 |
| 8,160,016 B2* | 4/2012 | Papasakellariou et al. | 370/329 |
| 8,165,228 B2* | 4/2012 | Lee et al. | 375/260 |
| 8,472,464 B2* | 6/2013 | Han | H04L 5/003 370/295 |
| 8,503,561 B2* | 8/2013 | Kim | H04L 5/0037 375/260 |
| 8,730,933 B2 | 5/2014 | Luo et al. | |
| 8,743,783 B2* | 6/2014 | Han | H04L 1/0031 370/328 |
| 9,031,004 B2* | 5/2015 | Han | H04L 1/0031 370/328 |
| 2006/0172704 A1 | 8/2006 | Nishio et al. | |
| 2007/0183386 A1 | 8/2007 | Muharemovic et al. | |
| 2008/0232449 A1 | 9/2008 | Khan et al. | |
| 2009/0046674 A1* | 2/2009 | Gao et al. | 370/337 |
| 2009/0060004 A1 | 3/2009 | Papasakellariou et al. | |
| 2009/0185638 A1 | 7/2009 | Imamura et al. | |
| 2009/0190685 A1 | 7/2009 | Kimura | |
| 2009/0245399 A1 | 10/2009 | Lee et al. | |
| 2010/0002800 A1* | 1/2010 | Kim et al. | 375/295 |
| 2010/0034165 A1 | 2/2010 | Han et al. | |
| 2010/0074244 A1 | 3/2010 | Luo et al. | |
| 2010/0080154 A1* | 4/2010 | Noh et al. | 370/310 |

FOREIGN PATENT DOCUMENTS

| | | |
|---|---|---|
| JP | 8321820 A | 12/1996 |
| JP | 2008028977 A | 2/2008 |
| JP | 2008053866 A | 3/2008 |
| JP | 2012506226 A | 3/2012 |
| WO | 2005015797 | 2/2005 |
| WO | WO2006096784 A1 | 9/2006 |
| WO | 2009019878 A1 | 2/2009 |

OTHER PUBLICATIONS

International Search Report and Written Opinion—PCT/US2010/039525, International Search Authority—European Patent Office—Oct. 21, 2010.

Niels Hadaschik, et al., "Achievable Data Rate of Wideband OFDM With Data-Aided Channel Estimation" Personal indoor and mobile radio communication, 2006 IEEE 7th international symposium on, IEEE, PI, Sep. 1, 2006, pp. 1-5, XP031023756.

Nortel: "Further discussion on UL reference signals" 3GPP Draft; R1-063105, 3rd Generation Partnership Project (3GPP), Mobile Competence Centre ; 650, Route Des Lucioles ; F-06921 Sophia-Antipolis Cedex ; France, vol. RAN WG1, no. Riga, Latvia; Nov. 1, 2006, XP050103564 [retrieved on Nov. 1, 2006] the whole document.

NTT Docomo et al: "Multiplexing Method for Orthogonal Reference Signals for E-UTRA Uplink" 3GPP Draft; R1-062726 UL Orthogonal Reference Signal, 3rd Generation Partnership Project (3GPP), Mobile Competence Centre ; 650, Route Des Lucioles ; F-06921 Sophia-Antipolis Cedex ; France, vol. RAN WG1, no. Seoul, Korea; Oct. 4, 2006, XP050103214 [retrieved on Oct. 4, 2006] the whole document.

Panasonic et al: "Uplink reference signal structure and allocation for E-UTRA" 3GPP Draft; R1-070190, 3rd Generation Partnership Project (3GPP), Mobile Competence Centre ; 650, Route Des Lucioles ; F-06921 Sophia-Antipolis Cedex ; France, vol. RAN WG1, no. Sorrento, Italy; Jan. 10, 2007, XP050104232 [retrieved on Jan. 10, 2007] the whole document.

Texas Instruments: "Uplink Reference Signal Design in EUTRA" 3GPP Draft; R1-063228_ULRS, 3rd Generation Partnership Project (3GPP), Mobile Competence Centre ; 650, Route Des Lucioles ; F-06921 Sophia-Antipolis Cedex ; France, vol. RAN WG1, no. Riga, Latvia; Nov. 2, 2006, XP050103681 [retrieved on Nov. 2, 2006] the whole document.

Lee D.H., et al., "A novel pilot mapping method for channel-quality estimation in SC-FDMA system", Communications, 2007. APCC 2007. Asia-Pacific Conference on, Oct. 20, 2007, pp. 307-310.

Luo X., et al., "Transmit Diversity Scheme over Single SC-FDM Symbol for LTE-Advanced", Global Telecommunications Conference, 2009. GLOBECOM 2009. IEEE, Dec. 4, 2009.

Mamoru Sawahashi et al., "Layer 1/Layer 2 Control Channel Structure in Single-Carrier FDMA Based Evolved UTRA Uplink," Technical Report of the Institute of Electronics, Information and Communication Engineers, Japan, Oct. 12, 2006, vol. 106, No. 305, pp. 137-142, RCS2006-156.

CMCC, "Discussions on DM-RS Design for LTE-A", 3GPP TSG-RAN WG1 Meeting #57, May 4, 2009, R1-092189.

NTT DoCoMo, Mitsubishi Electric, NEC, Panasonic, Sharp, Toshiba Corporation, "Orthogonal Reference Signal Structure for Uplink MIMO in E-UTRA", 3GPP TSG-RAN WG1 Meeting #47, Nov. 6 2006, R1-063308.

Taiwan Search Report—TW099120312—TIPO—Mar. 30, 2013.

Texas Instruments, "Overview of Distributed ("Sounding") Reference Signal Multiplexing Methods in EUTRA Ulink", 3GPP TSG-RAN WG1 Meeting #46b, Oct. 4, 2006, R1-062643.

Texas Instruments, "Uplink Reference Signal Sequence Assignments in E-UTRA", 3GPP TSG-RAN WG1 Meeting #50, Oct. 20, 2007, R1-073419.

Lucent Technologies, CAZAC Reference Signals for SC-FDMA, 3GPP TSG-RAN WG1 Meeting #46, Aug. 28, 2006, R1-062388, pp. 1-10.

Samsung, Reference signal structure for EUTRA Uplink, 3GPP TSG-RAN WG1 Meeting #44b, Mar. 27, 2006, R1-060818, pp. 1-6.

\* cited by examiner

TRANSMISSION OF REFERENCE SIGNAL ON NON-CONTIGUOUS CLUSTERS OF RESOURCES

The present application claims priority to provisional U.S. Application Ser. No. 61/219,294, entitled "SYSTEMS AND METHODS FOR DEMODULATION REFERENCE SIGNAL DESIGN—FOR LTE-ADVANCED," filed Jun. 22, 2009, assigned to the assignee hereof and incorporated herein by reference.

BACKGROUND

I. Field

The present disclosure relates generally to communication, and more specifically to techniques for transmitting a reference signal in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may transmit a reference signal and data to the base station. The reference signal may be used for channel estimation and/or other purposes. It may be desirable to transmit the reference signal such that good performance can be achieved.

SUMMARY

Techniques for transmitting a reference signal on multiple non-contiguous clusters of resources are described herein. A UE may be scheduled for data transmission on multiple non-contiguous clusters of resources. Each cluster may include one or more resource blocks and may cover a set of contiguous subcarriers. The UE may transmit a reference signal on the multiple non-contiguous clusters to enable channel estimation and data demodulation by a base station.

In one design, the UE may generate the reference signal for the multiple non-contiguous clusters of resources based on at least one reference signal (RS) sequence. The UE may generate the reference signal with code division multiplexing (CDM) or frequency division multiplexing (FDM). If the reference signal is generated with CDM, then the total length of the at least one RS sequence may match the total length of the multiple non-contiguous clusters. If the reference signal is generated with FDM, then the reference signal may be mapped to a subset of all subcarriers for the multiple non-contiguous clusters.

In one design, the UE may generate the reference signal with CDM based on a single RS sequence having a length matching the total length of the multiple non-contiguous clusters. In another design, the UE may generate the reference signal with CDM based on one RS sequence for each of the multiple non-contiguous clusters. For both designs, each RS sequence may be selected from a set of RS sequences available for use, and multiple UEs can simultaneously transmit their reference signals on one or more clusters with CDM based on different RS sequences in the set of RS sequences.

In another design, the UE may generate the reference signal with FDM and may transmit the reference signal on a subset of all subcarriers for the multiple non-contiguous clusters. At least one other UE can transmit at least one other reference signal on the remaining subcarriers for the multiple non-contiguous clusters.

The UE may transmit the reference signal on the multiple non-contiguous clusters, e.g., in one or more designated symbol periods of a subframe. The UE may transmit the reference signal from one antenna. Alternatively, the UE may generate the reference signal with precoding and may transmit the reference signal from multiple antennas. The UE may transmit data on the multiple non-contiguous clusters, e.g., in the remaining symbol periods of the subframe not used for the reference signal.

A base station may receive the reference signal from the UE and may process the received reference signal to derive a channel estimate for the UE. The base station may also receive data transmission from the UE and may perform demodulation for the received data transmission based on the channel estimate.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16

(WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
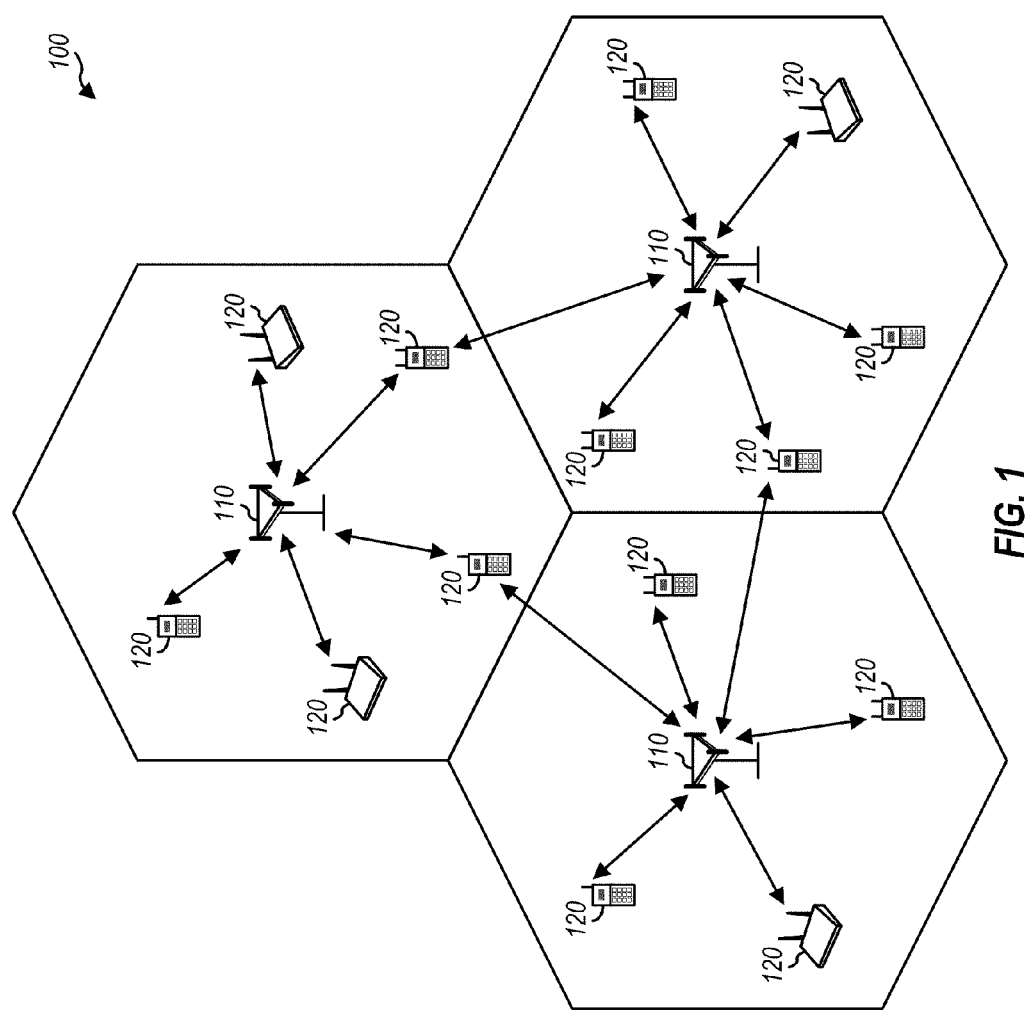
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency range into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 mega-Hertz (MHz), respectively. The system bandwidth may correspond to a subset of the K total subcarriers.

Figure 2:
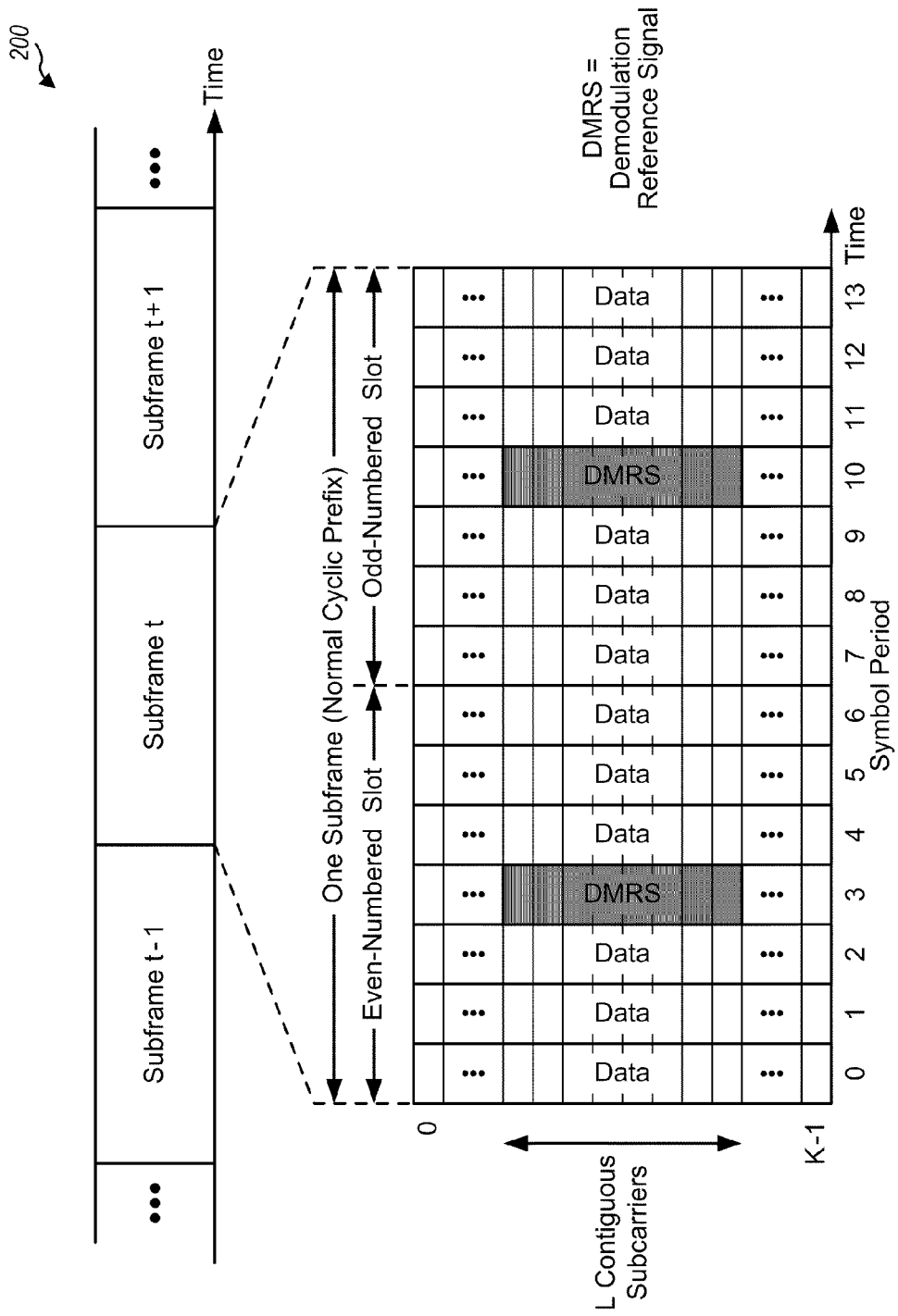
FIG. 2 shows an exemplary transmission structure.

FIG. 2 shows a transmission structure 200 for the uplink in LTE. The transmission timeline may be partitioned into units of subframes. Each subframe may have a predetermined duration, e.g., one millisecond (ms), and may be partitioned into two slots. Each slot may cover seven symbol periods for a normal cyclic prefix (as shown in FIG. 2) or six symbol periods for an extended cyclic prefix (not shown in FIG. 2). A number of resource blocks may be defined for each slot. Each resource block may cover 12 subcarriers in one slot. The number of resource blocks in each slot may be dependent on the system bandwidth and may range from 6 to 110 for system bandwidth of 1.25 MHz to 20 MHz, respectively. The available resource blocks may be assigned to UEs for transmission.

FIG. 2 also shows an exemplary uplink transmission on a Physical Uplink Shared Channel (PUSCH) in two slots of one subframe. The two slots may include 14 symbol periods with indices of 0 through 13 for the normal cyclic prefix. A UE may be assigned L contiguous subcarriers for transmission, where L may be an integer multiple of 12, which is the number of subcarriers for one resource block. The UE may transmit an SC-FDMA symbol comprising data on the L assigned subcarriers in each symbol period except for symbol periods 3 and 10. The UE may transmit an SC-FDMA symbol comprising a demodulation reference signal (DMRS) on the L assigned subcarriers in each of symbol periods 3 and 10. A reference signal is a signal that is known a priori by a transmitter and a receiver and may also be referred to as pilot, reference, preamble, training sequence, etc. A demodulation reference signal is a reference signal that is transmitted to aid a receiver performs demodulation for data transmission. The demodulation reference signal may be used by an eNB for channel estimation and coherent demodulation of SC-FDMA symbols carrying data.

For the extended cyclic prefix (not shown in FIG. 2), the two slots in one subframe may include 12 symbol periods with indices of 0 through 11. An SC-FDMA symbol comprising data on L assigned subcarriers may be sent in each symbol period except for symbol periods 2 and 8. An SC-FDMA symbol comprising a demodulation reference signal on the L assigned subcarriers may be sent in each of symbol periods 2 and 8.

FIG. 2 shows a case in which a UE is assigned L contiguous subcarriers for one or more resource blocks. Sending a transmission on contiguous subcarriers may allow the UE to maintain a single-carrier waveform, which may result in a lower peak-to-average-power ratio (PAPR). The lower PAPR may allow the UE to transmit at a higher output power level, which may be desirable. However, restricting transmission to contiguous subcarriers may limit the amount of resources that can be allocated to the UE and/or may place restrictions on scheduling of UEs, both of which may be undesirable.

A UE may be assigned multiple non-contiguous clusters of resources in order to avoid the disadvantages described above for transmission on contiguous subcarriers. A cluster may also be referred to as a band, a group, a block, etc. The multiple clusters may be non-contiguous in that at least one subcarrier separates any two non-contiguous clusters.

In an aspect, a UE may transmit a demodulation reference signal on multiple non-contiguous clusters to support demodulation of data transmission sent on these clusters. The UE may transmit the demodulation reference signal such that other UEs can simultaneously transmit their demodulation reference signals on the same clusters. The demodulation reference signals from all UEs may be multiplexed with CDM or FDM in various manners, as described below.

Figure 3:
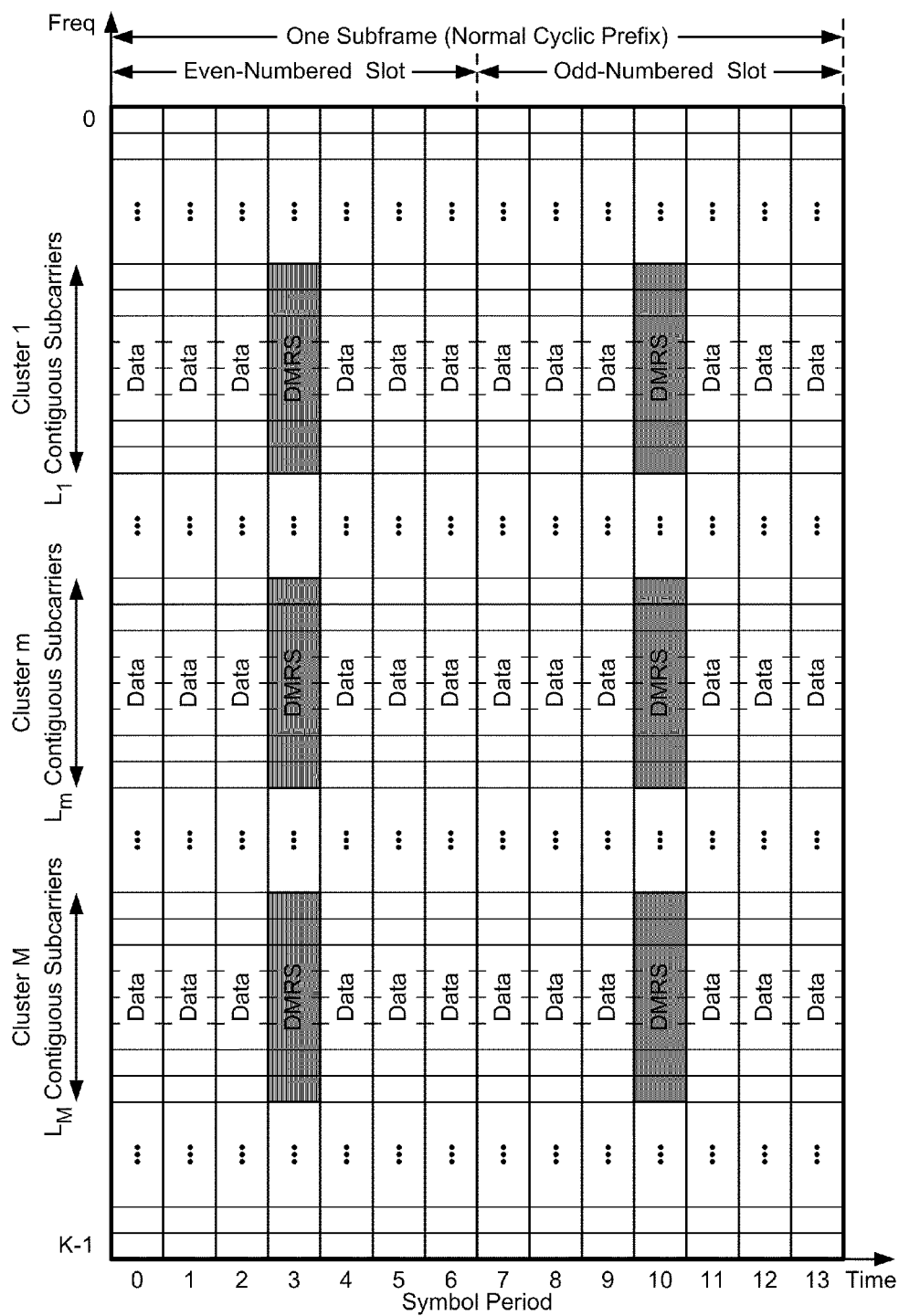
FIG. 3 shows transmission of a reference signal on multiple non-contiguous clusters.

FIG. 3 shows a design of transmitting data and a demodulation reference signal on multiple non-contiguous clusters. A UE may be assigned M non-contiguous clusters, where M may be any value greater than one. In one design, each cluster may include one or more resource blocks. The M clusters may have the same size or different sizes. In general, cluster m may have a size of $L_m$, where $m \in \{1, \ldots, M\}$ and $L_m > 1$. The size of cluster m, $L_m$, may be equal to the number of subcarriers covered by cluster m.

In the design shown in FIG. 3, the UE may transmit the demodulation reference signal in each of symbol periods 3 and 10 of a subframe and may transmit data in each remaining symbol period of the subframe. The UE may transmit data on all assigned subcarriers for the M non-contiguous clusters in each symbol period in which data is transmitted. The UE may transmit the demodulation reference signal on the assigned subcarriers for the M non-contiguous clusters in various manners.

In a first design of generating a demodulation reference signal, a single reference signal (RS) sequence may be used to generate the demodulation reference signal for transmission on multiple (M) non-contiguous clusters. In one design, the length of the RS sequence may be determined based on the total size of the M non-contiguous clusters, as follows:

$$L = \sum_{m=1}^{M} L_m,$$ Eq (1)

where L is the length of the RS sequence and is also the total size of the M non-contiguous clusters.

In one design, a set of RS sequences of length L may be generated with a base sequence having good correlation properties. The base sequence may be a CAZAC (constant amplitude zero auto correlation) sequence having a flat spectral response and zero auto-correlation. Zero auto-correlation means that the correlation of the CAZAC sequence with itself would result in a large value at zero offset and small (or zero) values at all other offsets. The zero auto-correlation property is beneficial for accurate detection of the CAZAC sequence. Some exemplary CAZAC sequences include Zadoff-Chu sequences, Chu sequences, Frank sequences, generalized chirp-like (GCL) sequences, computer-generated sequences, etc. For example, a Zadoff-Chu sequence of length L may be defined in a manner known in the art. Different RS sequences of length L may then be obtained with different time-domain cyclic shifts of the Zadoff-Chu sequence of length L. These different RS sequences would be orthogonal to one another and would have good auto-correlation property. Different types of base sequences may also be used, e.g., for different possible lengths. For example, computer-generated sequences may be used for base sequences of certain lengths, and Zadoff-Chu sequences may be used for base sequences of other lengths.

The UE may be assigned one RS sequence of length L from the set of RS sequences available for use. This assigned RS sequence may be represented by a time-domain sequence r(n) or a corresponding frequency-domain sequence R(k). Sequence R(k) may be obtained with an L-point discrete Fourier transform (DFT) of sequence r(n). The different RS sequences in the set may correspond to different cyclic shifts in the time domain and may have different phase ramps in the frequency domain.

Figure 4:
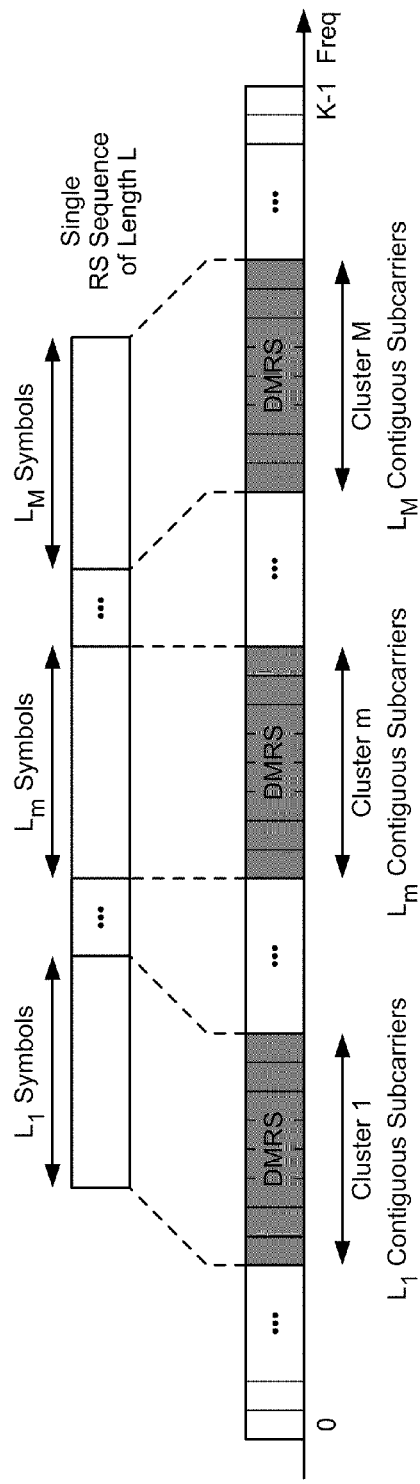
FIG. 4 shows generation of a reference signal based on a single RS sequence.

FIG. 4 shows generation of a demodulation reference signal based on the first design. An RS sequence of length L may be assigned to a UE. The RS sequence may be partitioned into M segments, one segment for each of M non-contiguous clusters. A first segment of length $L_1$ may include $L_1$ symbols that may be mapped to $L_1$ contiguous subcarriers for a first cluster. A second segment of length $L_2$ may include $L_2$ symbols that may be mapped to $L_2$ contiguous subcarriers for a second cluster. In general, segment m of length $L_m$ may include $L_m$ symbols that may be mapped to $L_m$ contiguous subcarriers for cluster m, where m∈{1, . . . , M}. A zero symbol with a signal value of zero may be mapped to each remaining subcarrier. An SC-FDMA symbol comprising the demodulation reference signal may be generated based on the mapped symbols for the K total subcarriers, as described below.

For the first design, multiple UEs may be assigned different RS sequences of length L. These UEs may simultaneously transmit their demodulation reference signals on the same resource elements (e.g., in symbol periods 3 and 10) of the M non-contiguous clusters. The demodulation reference signals from these UEs would be orthogonal to one another through CDM and may be separated by different cyclic shifts of the same base sequence spanning the entire resource allocation. These UEs may transmit their data on the same resource elements of the M non-contiguous clusters, e.g., in each symbol period except for symbol periods 3 and 10 for the normal cyclic prefix. The data transmissions from these UEs may be separated through spatial receiver processing by an eNB. These different UEs may be selected for multiplexing on the M non-contiguous clusters based on good spatial separation between these UEs.

The amount of inter-cell pilot interference (or interference due to a demodulation reference signal transmitted in another cell) may be dependent on the length of an RS sequence used to generate the demodulation reference signal. In a synchronous system, progressively longer RS sequence may result in progressively less inter-cell pilot interference. The first design may thus result in less inter-cell pilot interference due to the longer RS sequence length.

In a second design of generating a demodulation reference signal, a separate RS sequence may be selected for each of multiple (M) non-contiguous clusters. For each cluster m, a set of RS sequences of length $L_m$ may be available for use, where $L_m$ may be the size of the cluster. For each of the M non-contiguous clusters, a UE may be assigned one RS sequence of length $L_m$ from the set of RS sequences available for that cluster. A demodulation reference signal may be generated based on M RS sequences assigned to the UE for the M non-contiguous clusters.

Figure 5:
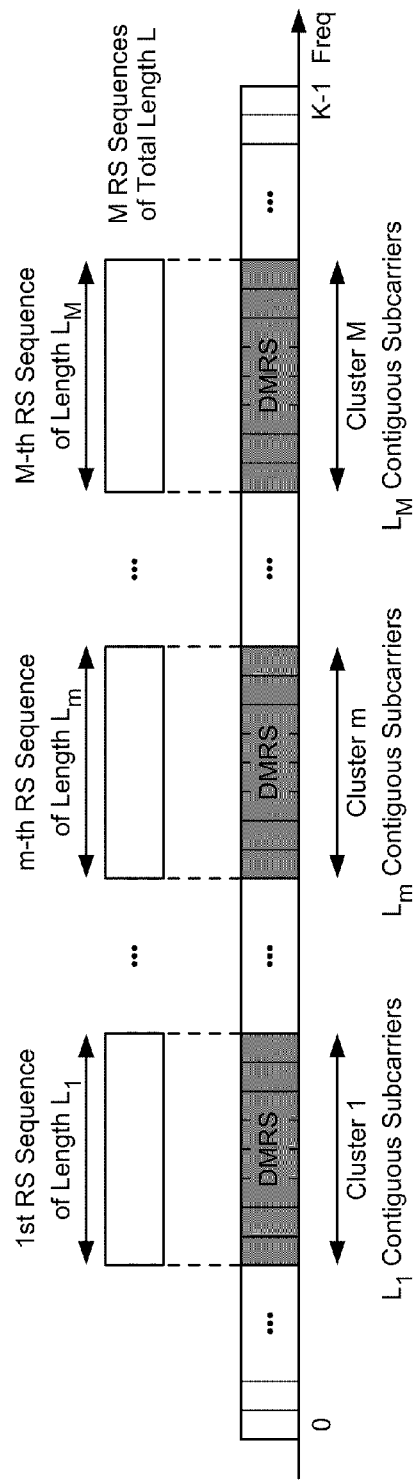
FIG. 5 shows generation of a reference signal based on one RS sequence for each cluster.

FIG. 5 shows generation of a demodulation reference signal based on the second design. M RS sequences with a total length of L may be assigned to a UE for M multiple non-contiguous clusters, one RS sequence for each cluster. The first RS sequence of length $L_1$ may include $L_1$ symbols that may be mapped to $L_1$ contiguous subcarriers for a first cluster. The second RS sequence of length $L_2$ may include $L_2$ symbols that may be mapped to $L_2$ contiguous subcarriers for a second cluster. In general, an RS sequence of length $L_m$ may include $L_m$ symbols that may be mapped to $L_m$ contiguous subcarriers for cluster m, where m∈{1, . . . , M}. A zero symbol may be mapped to each remaining subcarrier. An SC-FDMA symbol comprising the demodulation reference signal may be generated based on the mapped symbols for the K total subcarriers, as described below.

For the second design, multiple UEs may be multiplexed on each cluster and may be assigned different RS sequences for that cluster. For each cluster, the multiple UEs may simultaneously transmit their demodulation reference signals on the same resource elements (e.g., in symbol periods 3 and 10) of that cluster. The demodulation reference signals from these UEs may be orthogonal to one another through CDM and may be separated by different cyclic shifts of the same base sequence spanning the cluster.

The second design may allow a different set of UEs to be multiplexed on each cluster. For example, a given UE may be multiplexed with $Q_1$ other UEs on cluster 1, with $Q_2$ other UEs on cluster 2, etc. This may provide more flexibility in scheduling UEs for data transmission. For example, other UEs may be scheduled on one or more clusters without destroying orthogonality with the given UE. This may allow legacy UEs that can only transmit on contiguous subcarriers to be multiplexed with new UEs that can transmit on non-contiguous subcarriers. Furthermore, it may be easier to identify UEs that have good spatial separation on some (instead of all) of the M non-contiguous clusters. The second design may thus simplify scheduling of UEs and may also support backward compatibility for legacy UEs.

In a third design of generating a demodulation reference signal, a UE may be assigned a subset of all subcarriers for multiple non-contiguous clusters. The UE may then transmit a demodulation reference signal on the assigned subcarriers. The remaining subcarriers may be assigned to one or more other UEs for transmission of demodulation reference signals. The demodulation reference signals from these UEs may be separated using FDM instead of CDM.

Figure 6:
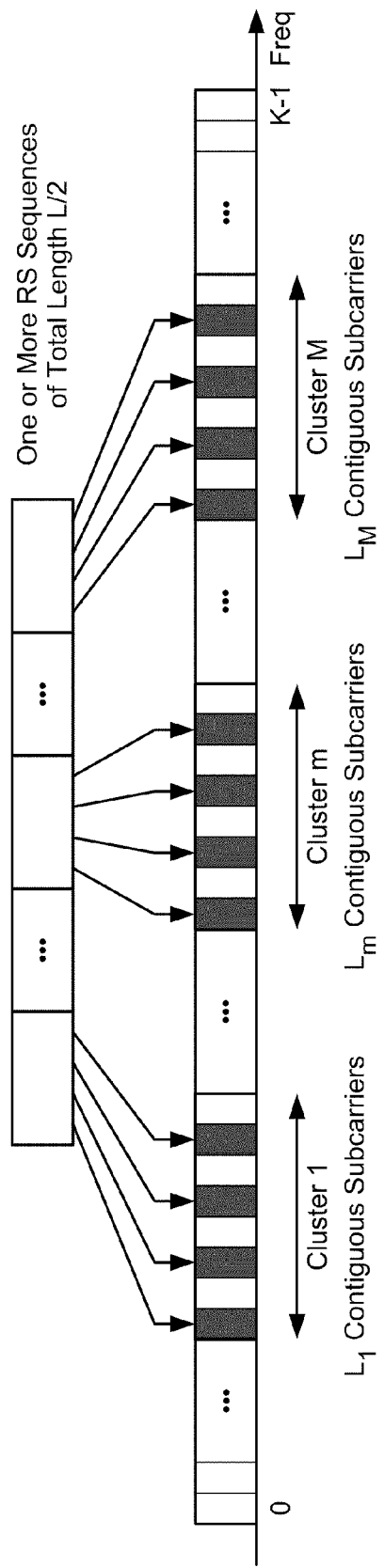
FIG. 6 shows generation of a reference signal with FDM.

FIG. 6 shows generation of a demodulation reference signal based on the third design. In one design, the subcarriers for each cluster may be partitioned into multiple (N) groups, with each group including every N-th subcarrier. In the example shown in FIG. 6, the subcarriers are partitioned into two groups, with each group including every other subcarrier. In particular, a first group may include subcarriers with even indices, and a second group may include subcarriers with odd indices.

A UE may be assigned one group of subcarriers for each cluster. The remaining group(s) of subcarriers for each cluster may be assigned to other UE(s). In one design, the UE may generate a single RS sequence of length L/N and may map the symbols in this RS sequence to the L/N subcarriers in its assigned groups for the M clusters. In another design, the UE may generate a separate RS sequence for each cluster and may map the symbols in the RS sequence to the assigned subcarriers for that cluster. In general, the UE may generate one or more RS sequences. Each RS sequence may be used for one or more clusters. The RS sequence(s) may be generated based on a computer-generated sequence, a Zadoff-Chu sequence, a pseudo-random number (PN) sequence, etc. Since FDM is used to multiplex different UEs, the RS sequences used by the UEs do not need to be orthogonal to one another.

FIG. 6 shows a design in which the subcarriers for each cluster are partitioned into two groups, and two UEs may be multiplexed on each cluster. In general, the subcarriers for each cluster may be partitioned into any number of groups. More groups may allow more UEs to be multiplexed on the same cluster but would also result in each UE being assigned fewer subcarriers for transmitting a demodulation reference signal, which may degrade performance.

For the third design, multiple UEs may be multiplexed on each cluster and may be assigned different groups of subcarriers for that cluster. For each cluster, the multiple UEs may simultaneously transmit their demodulation reference signals on different resource elements (e.g., in symbol periods 3 and 10) of that cluster. The demodulation reference signals from these UEs may be orthogonal to one another through FDM and may be separated by different subcarriers used for the demodulation reference signals.

The third design may allow a different set of UEs to be multiplexed on each cluster. For example, a given UE may be multiplexed with N−1 other UEs on cluster 1, with the same or different N−1 other UEs on cluster 2, etc. This may provide more flexibility in scheduling UEs for data transmission. For example, other UEs may be scheduled on any cluster without destroying orthogonality with the given UE. Furthermore, it may be easier to identify UEs that have good spatial separation on one or some clusters instead of all M non-contiguous clusters. The third design may thus simplify scheduling of UEs.

A UE may transmit a demodulation reference signal on M non-contiguous clusters in one symbol period of each slot, e.g., as shown in FIG. 3. This may provide good performance for static and low Doppler channels. The UE may be mobile, and high Doppler may be presence. The UE may transmit the demodulation reference signal in more than two symbol periods of a subframe in order to allow an eNB to capture time variations in the wireless channel due to high Doppler. This may improve performance in a high Doppler scenario.

Figure 7:
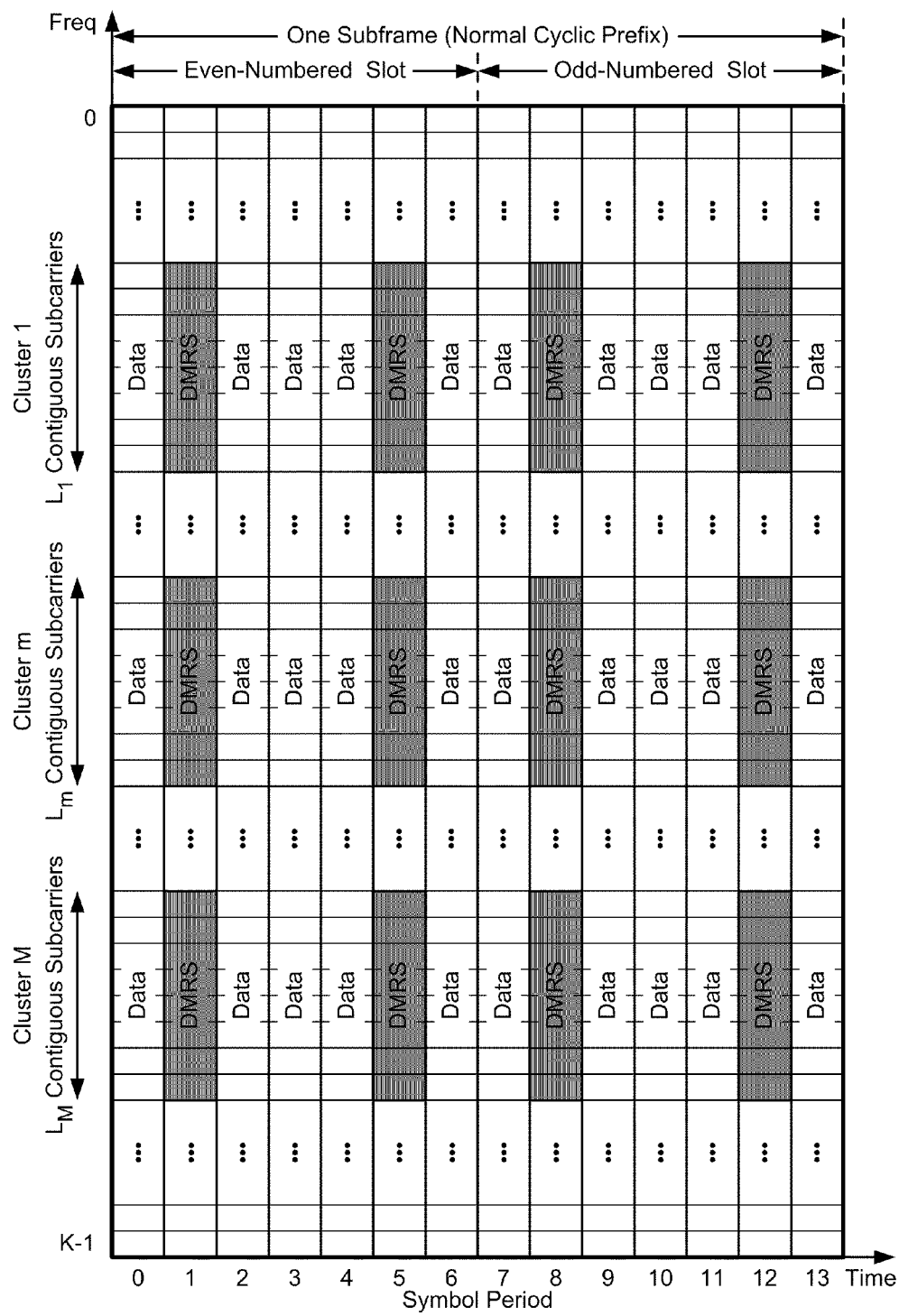
FIG. 7 shows transmission of a reference signal in more symbol periods to combat high Doppler.

FIG. 7 shows a design of transmitting data and a demodulation reference signal on multiple (M) non-contiguous clusters for high Doppler. A UE may be assigned M non-contiguous clusters. In the design shown in FIG. 7, the UE may transmit a demodulation reference signal in each of symbol periods 1, 5, 8 and 12 of a subframe and may transmit data in each remaining symbol period of the subframe.

FIG. 7 shows a design in which the UE may transmit the demodulation reference signal in two symbol periods of each slot, or four symbol periods of a subframe. In another design, the UE may transmit the demodulation reference signal in three symbol periods of each slot, e.g., in the second, fourth and sixth symbol periods of each slot. In yet another design, the UE may transmit the demodulation reference signal in three symbol periods of a subframe, e.g., in symbol periods 2, 6, and 11 of a subframe. The UE may also transmit the demodulation reference signal in fewer of more symbol periods of a slot or a subframe.

A UE may transmit a demodulation reference signal in multiple symbol periods of a slot to combat high Doppler in various manners. In one design, the UE may transmit the demodulation reference signal in each symbol period based on the first, second or third design described above. In another design, the UE may multiplex the demodulation reference signal with data in each symbol period in which the demodulation reference signal is transmitted. This design may reduce reference signal overhead. For example, the UE may multiplex the demodulation reference signal in a first part and data in a second part of each cluster. The first and second parts may correspond to different symbol periods in the time domain, or different subcarriers in the frequency domain, or some other resources. If the first part is equal to the second part, then overhead for the demodulation reference signal in FIG. 7 may be equal to overhead for the demodulation reference signal in FIG. 3. The first and second parts may also be configurable and may be selected based on channel conditions and/or other factors. The UE may generate the demodulation reference signal for transmission in the first part of each cluster based on an RS sequence of a suitable length. New computer-generated sequences of different lengths may be generated and used to derive RS sequences of different (e.g., configurable) lengths. Transmitting the demodulation reference signal in more symbol periods of a subframe may provide various advantages including improved channel estimation to combat high Doppler, improved performance of frequency and time tracking loops, etc.

A UE may be equipped with one or more (T) antennas and may transmit one or more demodulation reference signals from the T antennas in various manners. In one design, the UE may be assigned a different RS sequence for each antenna. The UE may generate a demodulation reference signal for each antenna based on the RS sequence for that antenna. The UE may then transmit T demodulation reference signals simultaneously from the T antennas. This design may allow an eNB to obtain a channel estimate for each antenna of the UE based on the demodulation reference signal transmitted from that antenna. This design may also allow the UE to transmit up to T data streams simultaneously from the T antennas. Each data stream may correspond to a codeword, a data packet, a transport block, etc.

In another design, the UE may transmit one or more (S) demodulation reference signals on S layers with precoding if the UE is equipped with multiple (T) antennas, where in general S≤T. Each layer may correspond to a spatial channel or beam formed by a precoding vector applied to the T antennas. The UE may be assigned a different RS sequence for each layer (instead of each antenna). The UE may generate a demodulation reference signal for each layer based on the RS sequence for that layer, as follows:

$$x(k) = Pr(k), \quad \text{Eq (2)}$$

where
r(k) is an S×1 vector with S reference symbols to be transmitted on the S layers of resource element k,
P is a T×S precoding matrix, and
x(k) is a T×1 vector with T output symbols for the T antennas.

The UE may transmit S demodulation reference signals simultaneously on the S layers with precoding.

The precoding matrix may be selected in various manners. In a frequency division duplex (FDD) system, the downlink and uplink may be allocated different frequency channels, and the downlink channel response may not match the uplink channel response. In this case, the precoding matrix may be selected by a UE from a codebook of precoding matrices and may be conveyed to an eNB by sending an index of the selected precoding matrix. In a time division duplex (TDD) system, the downlink and uplink may share the same frequency channel, and the downlink channel response may be highly correlated with the uplink channel response. In this case, the precoding matrix may be defined in any manner and may not be restricted to those in the codebook.

Precoding may be used in combination with the first, second, or third design described above when the S demodulation reference signals are transmitted on multiple (M) non-contiguous clusters. For the first design, a single RS sequence may be assigned to the UE for each layer and may be used to generate a demodulation reference signal for that layer on all M non-contiguous clusters. For the second design, a separate RS sequence may be assigned to the UE for each layer in each cluster and may be used to generate a demodulation reference signal for that layer in that cluster. For the third design, the UE may transmit the S demodulation reference signals on subcarriers assigned to the UE, which may be a subset of all subcarriers for the M non-contiguous clusters.

Precoding of the demodulation reference signals may be beneficial in a rank deficient scenario in which fewer data streams (e.g., one data stream) should be sent due to poor channel conditions. With precoding, the number of RS sequences to assign to the UE may be determined by the number of layers (instead of the number of antennas at the UE). If the RS sequences are different cyclic shifts of a base sequence, then greater cyclic shift separation may be obtained by transmitting fewer demodulation reference signals on fewer layers.

Figures 8, 9:
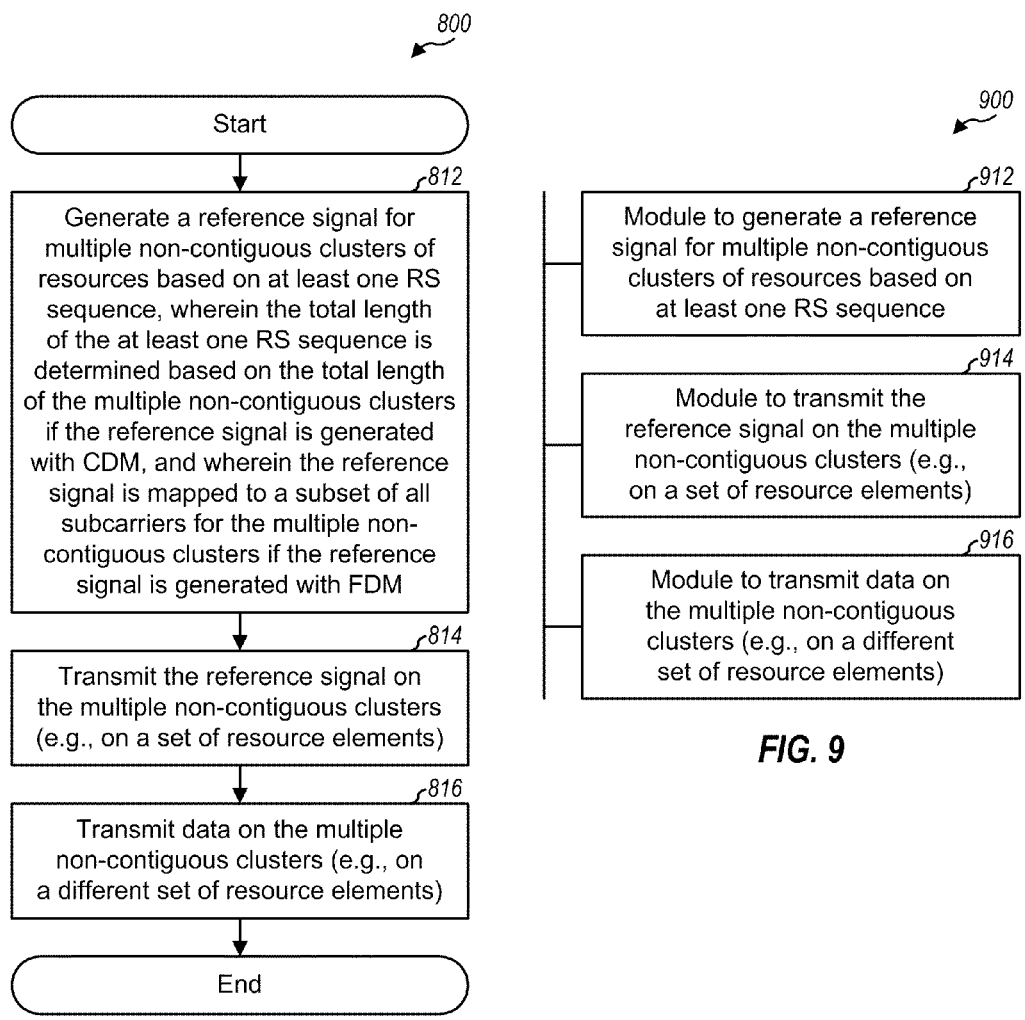
FIG. 8 shows a process for transmitting a reference signal.
FIG. 9 shows an apparatus for transmitting a reference signal.

FIG. 8 shows a design of a process 800 for transmitting a reference signal in a wireless communication system. Process 800 may be performed by a UE (as described below) or by some other entity. The UE may generate a reference signal (e.g., a demodulation reference signal) for multiple non-contiguous clusters of resources based on at least one RS sequence (block 812). Each cluster may include one or more resource blocks and may cover a set of contiguous subcarriers. The UE may generate the reference signal with CDM or FDM. The total length of the at least one RS sequence may be determined based on (e.g., may match) the total length of the multiple non-contiguous clusters if the reference signal is generated with CDM. The reference signal may be mapped to a subset of all subcarriers for the multiple non-contiguous clusters if the reference signal is generated with FDM.

For the first design described above, the UE may generate the reference signal with CDM based on a single RS sequence having a length matching the total length of the multiple non-contiguous clusters. The UE may receive an assignment of the single RS sequence, which may be selected from a set of RS sequences available for use. Multiple UEs can simultaneously transmit their reference signals on the multiple non-contiguous clusters based on different RS sequences in the set of RS sequences.

For the second design described above, the UE may generate the reference signal with CDM based on one RS sequence for each of the multiple non-contiguous clusters. The RS sequence for each cluster may have a length matching the length of that cluster. The UE may receive an assignment of the RS sequence for each of the multiple non-contiguous clusters. The RS sequence for each cluster may be selected from a set of RS sequences available for that cluster. Multiple UEs can simultaneously transmit their reference signals on each cluster based on different RS sequences in the set of RS sequences available for that cluster. In general, for CDM, the UE may be assigned one or more RS sequences. Each RS sequence may be selected from a set of RS sequences and may be used to generate a reference signal for one or more clusters.

For the third design described above, the UE may generate the reference signal with FDM and may transmit the reference signal on the subset of all subcarriers for the multiple non-contiguous clusters. At least one other UE can transmit at least one other reference signal on the remaining subcarriers for the multiple non-contiguous clusters. In one design, the subset of all subcarriers may comprise every N-th subcarrier among all subcarriers for the multiple non-contiguous clusters, where N is greater than one, e.g., as shown in FIG. 6.

In one design, the at least one RS sequence may be generated based on at least one computer-generated sequence, or at least one Zadoff-Chu sequence, or at least one other sequence. In one design, the at least one RS sequence may be generated based on at least one cyclic shift of at least one base sequence, e.g., each RS sequence may be generated based on a cyclic shift of a corresponding base sequence.

The UE may transmit the reference signal on the multiple non-contiguous clusters (block 814). In one design, the UE may transmit the reference signal from a single antenna. In another design, the UE may generate the reference signal with precoding and may transmit the reference signal on a layer from a plurality of antennas. In one design, the UE may transmit the reference signal in one symbol period of each slot of a subframe, e.g., as shown in FIG. 3. In another design, the UE may transmit the reference signal on the multiple non-contiguous clusters in at least three symbol periods of a subframe, e.g., in two symbol periods of each slot, as shown in FIG. 7.

In one design, the UE may transmit multiple reference signals from multiple antennas. The UE may transmit the reference signal from a first antenna in block 814. The UE may generate a second reference signal for the multiple non-contiguous clusters based on at least one additional RS sequence. The UE may transmit the second reference signal on the multiple non-contiguous clusters from a second antenna. The UE may also transmit one or more additional reference signals from one or more additional antennas using one or more additional RS sequences. The RS sequences used for different antennas may be different cyclic shifts of at least one base sequence.

In one design, the UE may transmit data on a first set of resource elements in the multiple non-contiguous clusters, e.g., in all symbol periods of a subframe except for symbol periods 3 and 10 (block 816). The UE may transmit the reference signal on a second set of resource elements in the multiple non-contiguous clusters, e.g., in symbol periods 3 and 10. Multiple UEs including the UE may simultaneously transmit data on the first set of resource elements, e.g., without CDM or FDM. These multiple UEs may simultaneously transmit their reference signals on the second set of resource elements, e.g., with CDM or FDM.

FIG. 9 shows a design of an apparatus 900 for transmitting a reference signal in a wireless communication system. Apparatus 900 includes a module 912 to generate a reference signal for multiple non-contiguous clusters of resources based on at least one RS sequence, with the total length of the at least one RS sequence being determined based on (e.g., matching) the total length of the multiple non-contiguous clusters if the reference signal is generated with CDM, and with the reference signal being mapped to a subset of all subcarriers for the multiple non-contiguous clusters if the reference signal is generated with FDM, a module 914 to transmit the reference signal on the multiple non-contiguous clusters (e.g., on a first set of resource elements), and a module 916 to transmit data on the multiple non-contiguous clusters (e.g., on a second set of resource elements).

Figures 10, 11:
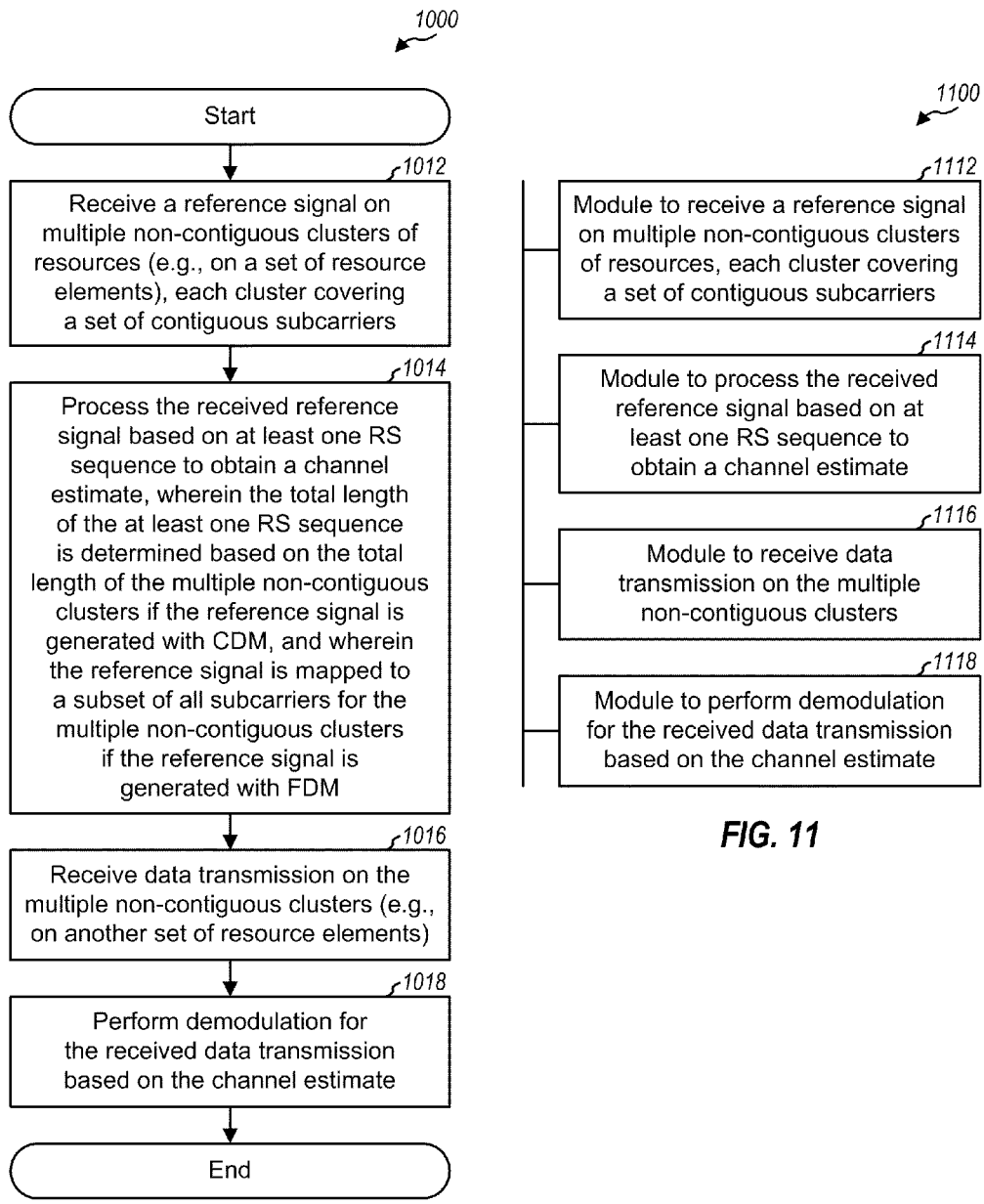
FIG. 10 shows a process for receiving a reference signal.
FIG. 11 shows an apparatus for receiving a reference signal.

FIG. 10 shows a design of a process 1000 for receiving a reference signal in a wireless communication system. Process 1000 may be performed by a base station/eNB (as described below) or by some other entity. The base station may receive a reference signal (e.g., a demodulation reference signal) on multiple non-contiguous clusters of resources from a UE (block 1012). Each cluster may include one or more resource blocks and may cover a set of contiguous subcarriers.

The base station may process the received reference signal based on at least one RS sequence to obtain a channel estimate for a wireless channel from the UE to the base station (block 1014). The reference signal may be generated with CDM or FDM. The total length of the at least one RS sequence may be determined based on (e.g., may match) the total length of the multiple non-contiguous clusters if the reference signal is generated with CDM. The reference signal may be mapped to a subset of all subcarriers for the multiple non-contiguous clusters if the reference signal is generated with FDM.

For the first design described above, the reference signal may be generated with CDM by the UE. The base station may process the received reference signal based on a single RS sequence having a length matching the total length of the multiple non-contiguous clusters. For the second design described above, the reference signal may be generated with CDM by the UE. The base station may process the received reference signal based on one RS sequence for each of the multiple non-contiguous clusters. The RS sequence for each cluster may have a length matching the length of that cluster. In general, the base station may process the received reference signal based on one or more RS sequences, and each RS sequence may cover one or more clusters.

For the third design described above, the reference signal may be generated with FDM by the UE. The base station may receive the reference signal from the UE on the subset of all subcarriers for the multiple non-contiguous clusters. The base station may receive at least one other reference signal from at least one other UE on the remaining subcarriers for the multiple non-contiguous clusters. The subset of all subcarriers may comprise every N-th subcarrier among all subcarriers for the multiple non-contiguous clusters, e.g., as shown in FIG. 6.

In one design, the reference signal may be transmitted in one symbol period of each slot of a subframe, e.g., as shown in FIG. 3. The base station may derive a channel estimate for each slot based on the reference signal received in that slot. In another design, the base station may receive the reference signal on the multiple non-contiguous clusters in at least three symbol periods of a subframe, e.g., as shown in FIG. 7. The base station may derive channel estimates across the subframe based on the reference signal received in the more symbol periods.

In one design, the reference signal may be transmitted from a single antenna at the UE. The base station may derive a channel estimate for the single antenna based on the received reference signal. In another design, the reference signal may be generated with precoding and transmitted from a plurality of antennas at the UE. The base station may process the received reference signal to obtain a channel estimate for a layer on which the reference signal is transmitted.

In yet another design, multiple reference signals may be transmitted from multiple antennas at the UE. The base station may process the received reference signal in block 1014 to obtain a channel estimate for a first antenna from which the reference signal is transmitted. The base station may receive a second reference signal on the multiple non-contiguous clusters. The base station may process the received second reference signal based on at least one additional RS sequence to obtain a second channel estimate for a second antenna from which the second reference signal is transmitted.

The base station may receive data transmission on a first set of resource elements in the multiple non-contiguous clusters from the UE (block 1016). The base station may receive the reference signal from the UE on a second set of resource elements in the multiple non-contiguous clusters. The base station may perform demodulation for the received data transmission based on the channel estimate (block 1018).

FIG. 11 shows a design of an apparatus 1100 for receiving a reference signal in a wireless communication system. Apparatus 1100 includes a module 1112 to receive a reference signal on multiple non-contiguous clusters of resources (e.g., on a first set of resource elements), each cluster covering a set of contiguous subcarriers, a module 1114 to process the received reference signal based on at least one RS sequence to obtain a channel estimate, with the total length of the at least one RS sequence being determined based on (e.g., matching) the total length of the multiple non-contiguous clusters if the reference signal is generated with CDM, and with the reference signal being mapped to a subset of all subcarriers for the multiple non-contiguous clusters if the reference signal is generated with FDM, a module 1116 to receive data transmission on the multiple non-contiguous clusters (e.g., on a second set of resource elements), and a module 1118 to perform demodulation for the received data transmission based on the channel estimate.

The modules in FIGS. 9 and 11 may comprise processors, electronic devices, hardware devices, electronic components, logical circuits, memories, software codes, firmware codes, etc., or any combination thereof.

Figure 12:
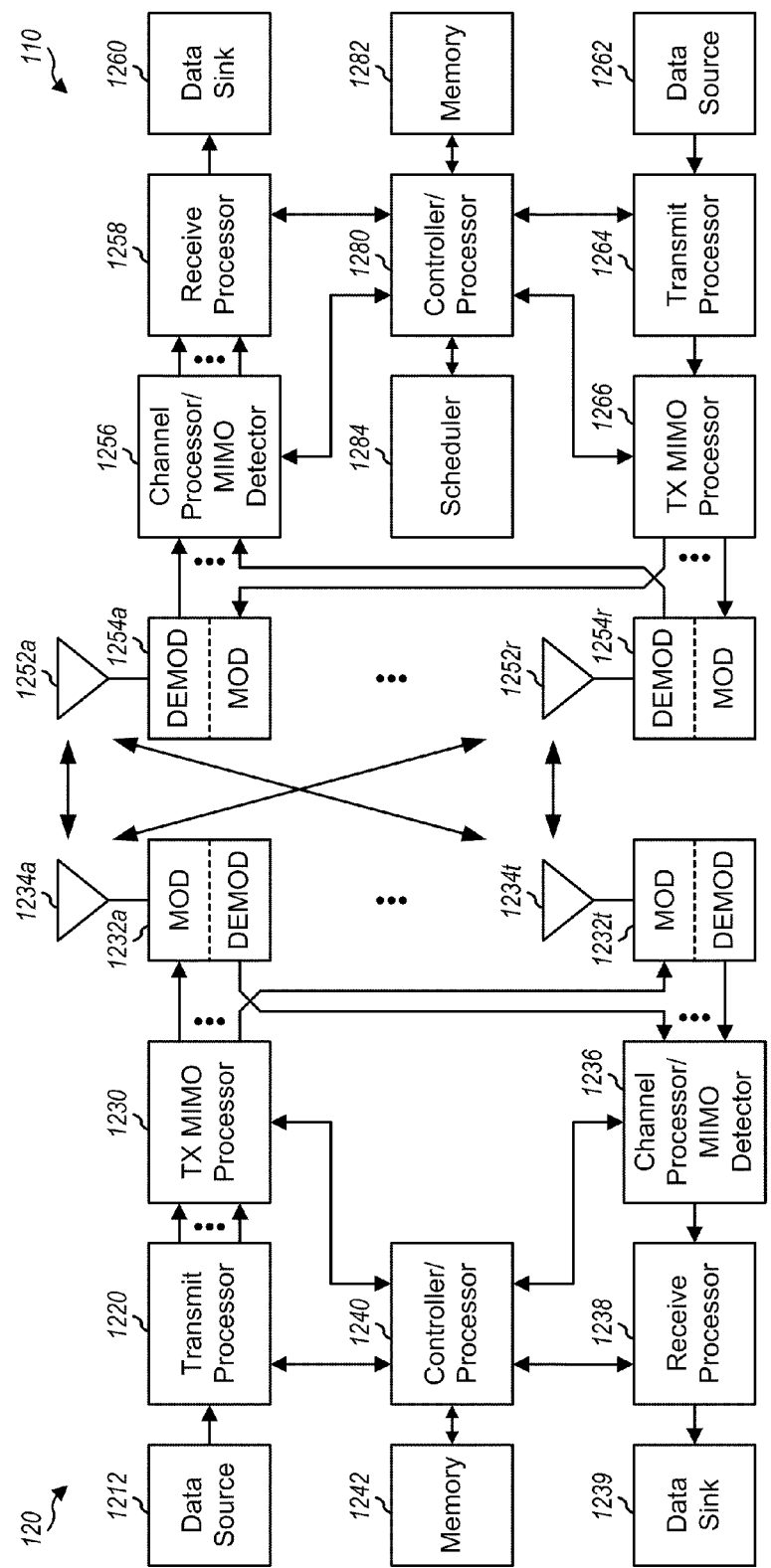
FIG. 12 shows a block diagram of a base station and a UE.

FIG. 12 shows a block diagram of a design of a base station/eNB 110 and a UE 120, which may be one of the eNBs and one of the UEs in FIG. 1. UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 800 in FIG. 8 and/or other processes for the techniques described herein. Processor 1256, processor 1280, and/or other processors and modules at base station 110 may perform or direct process 1000 in FIG. 10 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

Figure 13:
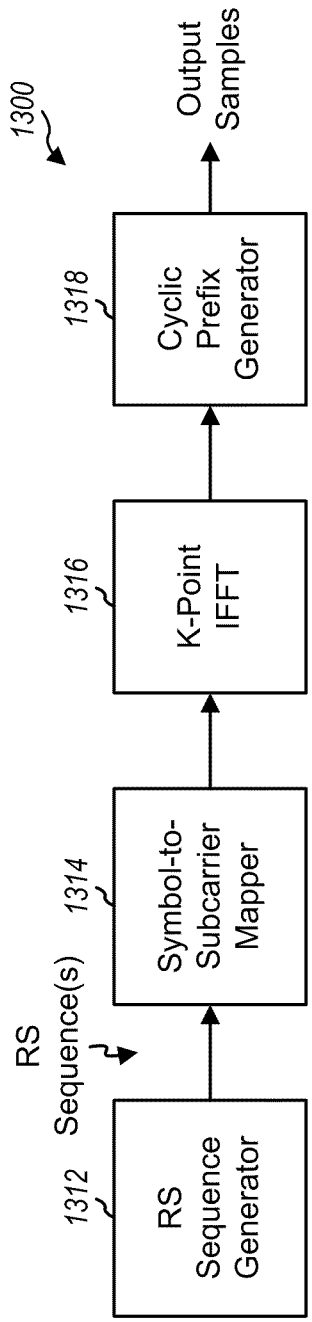
FIG. 13 shows a block diagram of a transmitter for a reference signal.

FIG. 13 shows a block diagram of a design of a transmitter 1300 that can generate a demodulation reference signal for transmission on multiple non-contiguous clusters from one antenna. Transmitter 1300 may be implemented by transmit processor 1220 and modulator 1232a at UE 120 in FIG. 12. Within transmitter 1300, an RS sequence generator 1312 may generate one or more RS sequences for the demodulation reference signal. For the first design, generator 1312 may generate a single RS sequence of length L assigned to UE 120. For the second design, generator 1312 may generate M RS sequences assigned to UE 120 for the M non-contiguous clusters. In general, generator 512 may generate one or more RS sequences assigned to UE 120 for the M non-contiguous clusters.

A symbol-to-subcarrier mapper 1314 may receive one or more RS sequences from generator 1312 and may map the reference symbols in the RS sequence(s) to subcarriers for the M non-contiguous clusters. For the first design, mapper 1314 may receive a single RS sequence and may map the L reference symbols in this RS sequence to L subcarriers for the M non-contiguous clusters. For the second design, mapper 1314 may receive M RS sequences and may map the $L_m$ symbols in each RS sequence to $L_m$ subcarriers for the corresponding cluster m. In general, mapper 1314 may receive one or more RS sequences and may map the symbols in each RS sequence to assigned subcarriers in one or more clusters. Mapper 1314 may also map a zero symbol to each remaining subcarrier not used for transmission.

A unit 1316 may receive K mapped symbols for the K total subcarriers, perform a K-point inverse fast Fourier transform (IFFT) on the K mapped symbols, and provide K time-domain output samples. A cyclic prefix generator 418 may copy the last G samples of the K output samples, append these G samples to the front of the K output samples, and provide an SC-FDMA symbol comprising K+G output samples. Each output sample may be a complex value to be transmitted in one sample period. The cyclic prefix may be used to combat inter-symbol interference (ISI) caused by frequency selective fading.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication at a user equipment, comprising:
   generating a demodulation reference signal (RS) sequence having a length equal to a total size of assigned non-contiguous clusters of subcarriers of a plurality of resource blocks of a slot of a subframe;
   clustering a first set of contiguous subcarriers to generate a first cluster of subcarriers;
   clustering a second set of contiguous subcarriers to generate a second cluster of subcarriers, at least one subcarrier being defined between the first set of contiguous subcarriers and the second set of contiguous subcarriers, the assigned non-contiguous clusters comprising at least the first cluster and the second cluster, a number of contiguous subcarriers of each cluster being equal to or greater than a number of symbols of each segment;
   partitioning the demodulation RS sequence into segments, one segment for each cluster of the assigned non-contiguous clusters; and
   transmitting a demodulation RS associated with the demodulation RS sequence segments on the assigned non-contiguous clusters.

2. The method of claim 1, further comprising mapping a zero symbol having a signal value of zero to subcarriers not associated with the non-contiguous clusters.

3. The method of claim 1, further comprising mapping a specific segment of the portioned demodulation RS sequence to a specific cluster of the non-contiguous clusters, a number of symbols of the specific segment being equal to a number of subcarriers of the specific cluster.

4. The method of claim 1, in which the assigned non-contiguous clusters of subcarriers are subcarriers of a shared channel.

5. The method of claim 1, in which the length of the demodulation RS sequence has a one-to-one mapping relationship to the number of non-contiguous clusters of subcarriers.

6. An apparatus for wireless communication, comprising:
   means for generating a demodulation reference signal (RS) sequence having a length equal to a total size of assigned non-contiguous clusters of subcarriers of a plurality of resource blocks of a slot of a subframe;
   means for clustering a first set of contiguous subcarriers to generate a first cluster of subcarriers;
   means for clustering a second set of contiguous subcarriers to generate a second cluster of subcarriers, at least one subcarrier being defined between the first set of contiguous subcarriers and the second set of contiguous subcarriers, the assigned non-contiguous clusters comprising at least the first cluster and the second cluster, a number of contiguous subcarriers of each cluster being equal to or greater than a number of symbols of each segment;
   means for partitioning the demodulation RS sequence into segments, one segment for each cluster of the assigned non-contiguous clusters; and
   means for transmitting a demodulation RS associated with the demodulation RS sequence segments on the assigned non-contiguous clusters.

7. The apparatus of claim 6, further comprising means for mapping a zero symbol having a signal value of zero to subcarriers not associated with the non-contiguous clusters.

8. A non-transitory computer-readable medium having program code recorded thereon, the program code comprising:
   program code to generate a demodulation reference signal (RS) sequence having a length equal to a total size of assigned non-contiguous clusters of subcarriers of a plurality of resource blocks of a slot of a subframe;
   program code to cluster a first set of contiguous subcarriers to generate a first cluster of subcarriers;
   program code to cluster a second set of contiguous subcarriers to generate a second cluster of subcarriers, at least one subcarrier being defined between the first set of contiguous subcarriers and the second set of contiguous subcarriers, the assigned non-contiguous clusters comprising at least the first cluster and the second cluster, a number of contiguous subcarriers of each cluster being equal to or greater than a number of symbols of each segment;

program code to partition the demodulation RS sequence into segments, one segment for each cluster of the assigned non-contiguous clusters; and program code to transmit a demodulation RS associated with the demodulation RS sequence segments on the assigned non-contiguous clusters.

9. The computer-readable medium of claim 8, the program code further comprising program code to map a zero symbol having a signal value of zero to subcarriers not associated with the non-contiguous clusters.

10. An apparatus for wireless communication, comprising:
a memory; and
at least one processor coupled to the memory, the at least one processor being configured:
to generate a demodulation reference signal (RS) sequence having a length equal to a total size of assigned non-contiguous clusters of subcarriers of a plurality of resource blocks of a slot of a subframe;

to cluster a first set of contiguous subcarriers to generate a first cluster of subcarriers;

to cluster a second set of contiguous subcarriers to generate a second cluster of subcarriers, at least one subcarrier being defined between the first set of contiguous subcarriers and the second set of contiguous subcarriers, the assigned non-contiguous clusters comprising at least the first cluster and the second cluster, a number of contiguous subcarriers of each cluster being equal to or greater than a number of symbols of each segment;

to partition the demodulation RS sequence into segments, one segment for each cluster of the assigned non-contiguous clusters; and to transmit a demodulation RS associated with the demodulation RS sequence segments on the assigned non-contiguous clusters.

11. The apparatus of claim 10, in which the at least one processor is further configured to map a zero symbol having a signal value of zero to subcarriers not associated with the non-contiguous clusters.

* * * * *